US010985608B2

(12) United States Patent
Murray

(10) Patent No.: US 10,985,608 B2
(45) Date of Patent: Apr. 20, 2021

(54) BACK-UP POWER SYSTEM FOR A COMPONENT AND METHOD OF ASSEMBLING SAME

(71) Applicant: GENERAL ELECTRIC COMPANY, Schenectady, NY (US)

(72) Inventor: Ernest Russell Murray, Pendleton, SC (US)

(73) Assignee: General Electric Company, Schenectady, NY (US)

(*) Notice: Subject to any disclaimer, the term of this patent is extended or adjusted under 35 U.S.C. 154(b) by 343 days.

(21) Appl. No.: 15/377,552

(22) Filed: Dec. 13, 2016

(65) Prior Publication Data

US 2018/0166914 A1 Jun. 14, 2018

(51) Int. Cl.
*H02J 9/06* (2006.01)

(52) U.S. Cl.
CPC ............... *H02J 9/066* (2013.01); *Y02B 70/30* (2013.01); *Y04S 20/20* (2013.01)

(58) Field of Classification Search
CPC ........... H02J 9/066; H02J 9/062; Y02B 70/30; Y04S 20/20
USPC ..................... 307/68; 318/434, 442, 503, 504
See application file for complete search history.

(56) References Cited

U.S. PATENT DOCUMENTS

| | | | |
|---|---|---|---|
| 5,501,083 A * | 3/1996 | Kim | F25B 27/005 307/64 |
| 5,537,834 A | 7/1996 | Farr | |
| 5,627,417 A | 5/1997 | Clarke | |
| 5,699,222 A | 12/1997 | Innes | |
| 5,771,868 A | 6/1998 | Khair | |
| 5,781,385 A | 7/1998 | Permuy | |
| 5,959,428 A | 9/1999 | Saito et al. | |
| 6,062,026 A | 5/2000 | Woollenweber et al. | |
| 6,079,211 A | 6/2000 | Woollenweber et al. | |
| 6,134,124 A * | 10/2000 | Jungreis | H02J 9/066 363/34 |
| 6,379,108 B1 | 4/2002 | Schmidt | |
| 6,452,359 B1 | 9/2002 | Schwarz et al. | |
| 6,502,398 B2 | 1/2003 | Kapich | |
| 6,536,679 B2 | 3/2003 | Baeuerle et al. | |
| 6,604,362 B2 | 8/2003 | Moeckel | |

(Continued)

FOREIGN PATENT DOCUMENTS

| | | |
|---|---|---|
| EP | 774822 A1 | 5/1997 |
| EP | 647006 B1 | 6/1998 |

(Continued)

*Primary Examiner* — Toan T Vu
(74) *Attorney, Agent, or Firm* — Armstrong Teasdale LLP

(57) ABSTRACT

A back-up power control system for an AC-powered component includes a bypass starter coupled to an AC bus, and a variable frequency drive (VFD) coupled to a DC bus. The VFD is selectively operable in each of (i) an active mode, such that said VFD converts DC power provided by the DC bus into a selectable frequency AC power signal, and (ii) a stand-by low-power mode. The system also includes a controller operatively coupled to the bypass starter and the VFD and programmed to (a) while the AC bus is in a normal operating condition, command the VFD to the low-power mode and operatively couple the bypass starter to the AC-powered component, and (b) while the AC bus is in an outage condition, command the VFD to the active mode and operatively couple the VFD to the AC-powered component.

18 Claims, 4 Drawing Sheets

(56) References Cited

U.S. PATENT DOCUMENTS

| | | |
|---|---|---|
| 6,659,726 B2 | 12/2003 | Holden |
| 6,941,755 B2 | 9/2005 | Bucknell et al. |
| 7,010,918 B2 | 3/2006 | Ruess |
| 7,162,872 B2 | 1/2007 | Schmid et al. |
| 7,294,313 B2 | 11/2007 | Jacob et al. |
| 7,503,426 B2 | 3/2009 | Yaoita |
| 7,535,150 B1 | 5/2009 | Wilson et al. |
| 7,558,031 B2 | 7/2009 | Boren |
| 7,703,284 B2 | 4/2010 | Becker et al. |
| 7,811,068 B2 | 10/2010 | Weeber et al. |
| 7,921,944 B2 | 4/2011 | Russell et al. |
| 7,948,721 B2 | 5/2011 | Brunner et al. |
| 7,950,218 B2 | 5/2011 | Beutin et al. |
| 8,056,318 B2 | 11/2011 | Chillar et al. |
| 8,096,139 B2 | 1/2012 | Taras et al. |
| 8,156,757 B2 | 4/2012 | Doty et al. |
| 8,312,720 B2 | 11/2012 | Kraetschmer et al. |
| 8,436,713 B2 | 5/2013 | Hormann |
| 8,468,801 B2 | 6/2013 | Shimizu et al. |
| 8,601,810 B2 | 12/2013 | Tanaka et al. |
| 8,639,387 B2 | 1/2014 | Byberg et al. |
| 8,640,672 B2 | 2/2014 | Carlstroem et al. |
| 8,691,086 B2 | 4/2014 | Oklejas, Jr. |
| 8,740,746 B2 | 6/2014 | Figler et al. |
| 8,763,385 B2 | 7/2014 | Leone |
| 8,779,698 B2 | 7/2014 | Havard et al. |
| 8,922,964 B2 | 12/2014 | Chuang et al. |
| 8,987,936 B2 | 3/2015 | Du et al. |
| 8,991,174 B2 | 3/2015 | Boening et al. |
| 9,018,882 B2 | 4/2015 | Mack et al. |
| 9,080,503 B2 | 7/2015 | Buschur et al. |
| 9,118,226 B2 | 8/2015 | Kacludis et al. |
| 9,160,258 B2 | 10/2015 | Rockenfeller et al. |
| 9,221,641 B2 | 12/2015 | Dollevoet et al. |
| 9,242,204 B2 | 1/2016 | Iijima |
| 9,273,593 B2 | 3/2016 | Sato |
| 9,341,145 B2 | 5/2016 | Maier |
| 2002/0041172 A1 | 4/2002 | Schwarz et al. |
| 2002/0104308 A1 | 8/2002 | Dudd et al. |
| 2002/0124566 A1 | 9/2002 | Kapich |
| 2002/0157397 A1 | 10/2002 | Kapich |
| 2002/0179726 A1 | 12/2002 | Baeuerle et al. |
| 2003/0110769 A1 | 6/2003 | Moeckel |
| 2003/0123989 A1 | 7/2003 | Holden |
| 2004/0045682 A1 | 3/2004 | Liprie |
| 2004/0252423 A1 | 12/2004 | Boren |
| 2005/0086936 A1 | 4/2005 | Bucknell et al. |
| 2005/0126169 A1 | 6/2005 | Ruess |
| 2005/0252211 A1 | 11/2005 | Schmid et al. |
| 2006/0045835 A1 | 3/2006 | Eberhard et al. |
| 2006/0053776 A1 | 3/2006 | Ancimer et al. |
| 2007/0034444 A1 | 2/2007 | Yaoita |
| 2007/0062188 A1 | 3/2007 | Fry et al. |
| 2007/0110596 A1 | 5/2007 | Weeber et al. |
| 2008/0034752 A1 | 2/2008 | Becker et al. |
| 2008/0095652 A1 | 4/2008 | Jiang |
| 2008/0115527 A1 | 5/2008 | Doty et al. |
| 2008/0141656 A1 | 6/2008 | Beutin et al. |
| 2008/0174257 A1* | 7/2008 | Schnetzka ............ F25B 49/025 318/434 |
| 2009/0107142 A1 | 4/2009 | Russell et al. |
| 2009/0129423 A1 | 5/2009 | Wilson et al. |
| 2009/0167229 A1 | 7/2009 | Brunner et al. |
| 2009/0173071 A1 | 7/2009 | Kapich |
| 2009/0255278 A1 | 10/2009 | Taras et al. |
| 2009/0265080 A1 | 10/2009 | Fry et al. |
| 2010/0028730 A1 | 2/2010 | Ghezel-Ayagh et al. |
| 2010/0040493 A1 | 2/2010 | Wilson |
| 2010/0101531 A1 | 4/2010 | Carlstroem et al. |
| 2010/0263374 A1 | 10/2010 | Tanaka et al. |
| 2010/0300090 A1 | 12/2010 | Kraetschmer et al. |
| 2011/0016855 A1 | 1/2011 | Shimizu et al. |
| 2011/0018472 A1 | 1/2011 | Rockenfeller et al. |
| 2011/0018473 A1 | 1/2011 | Rockenfeller et al. |
| 2011/0146274 A1 | 6/2011 | Shimizu et al. |
| 2011/0198290 A1 | 8/2011 | Oklejas, Jr. |
| 2011/0294621 A1 | 12/2011 | Figler et al. |
| 2012/0137676 A1 | 6/2012 | Murata et al. |
| 2012/0187886 A1* | 7/2012 | Mack ...................... H02P 27/06 318/503 |
| 2012/0210874 A1 | 8/2012 | Iijima |
| 2013/0087319 A1 | 4/2013 | Havard et al. |
| 2013/0091844 A1 | 4/2013 | Leone et al. |
| 2013/0119666 A1 | 5/2013 | Holt et al. |
| 2013/0235494 A1 | 9/2013 | Holce et al. |
| 2013/0283783 A1 | 10/2013 | Sato |
| 2014/0097690 A1* | 4/2014 | Costa ........................ H02J 9/00 307/64 |
| 2014/0102105 A1 | 4/2014 | Janapaneedi et al. |
| 2014/0103661 A1 | 4/2014 | Kacludis et al. |
| 2014/0128656 A1 | 5/2014 | Arluck et al. |
| 2014/0190198 A1* | 7/2014 | Slessman ........... H05K 7/20745 62/314 |
| 2014/0195134 A1 | 7/2014 | Maier |
| 2014/0250900 A1 | 9/2014 | Carroni et al. |
| 2014/0348710 A1 | 11/2014 | Miller et al. |
| 2015/0040808 A1 | 2/2015 | Yamamoto et al. |
| 2015/0075159 A1 | 3/2015 | Kemmerling et al. |
| 2015/0096295 A1 | 4/2015 | Zavala et al. |
| 2015/0204279 A1 | 7/2015 | Kemmerling et al. |
| 2015/0247446 A1 | 9/2015 | Doenitz et al. |
| 2015/0256029 A1 | 9/2015 | Cinti et al. |
| 2015/0377136 A1 | 12/2015 | Bellabal |
| 2016/0003130 A1 | 1/2016 | Brinkmann et al. |
| 2016/0040678 A1 | 2/2016 | Stilgenbauer et al. |
| 2016/0047298 A1 | 2/2016 | Lofgren |
| 2016/0069624 A1 | 3/2016 | Rollins et al. |
| 2016/0076438 A1 | 3/2016 | Tabata et al. |
| 2016/0091266 A1 | 3/2016 | Freitag |
| 2016/0131712 A1* | 5/2016 | Bock .................... H01H 47/002 324/537 |
| 2016/0169127 A1 | 6/2016 | Rammer et al. |
| 2016/0380570 A1* | 12/2016 | Farr ........................ H02P 1/04 318/504 |
| 2018/0062553 A1* | 3/2018 | Van ....................... H02P 29/024 |

FOREIGN PATENT DOCUMENTS

| | | |
|---|---|---|
| EP | 831570 A3 | 11/1998 |
| EP | 1023530 A1 | 8/2000 |
| EP | 1083318 A2 | 3/2001 |
| EP | 782265 B1 | 6/2003 |
| EP | 1327776 A3 | 8/2004 |
| EP | 865152 B1 | 9/2004 |
| EP | 1180577 B1 | 11/2005 |
| EP | 1832751 A1 | 9/2007 |
| EP | 1405995 B1 | 12/2007 |
| EP | 1426620 B1 | 11/2010 |
| EP | 2309102 A1 | 4/2011 |
| EP | 1342304 B1 | 9/2012 |
| EP | 2525057 A1 | 11/2012 |
| EP | 2527615 A1 | 11/2012 |
| EP | 2573356 A2 | 3/2013 |
| EP | 2607644 A1 | 6/2013 |
| EP | 2261479 B1 | 9/2013 |
| EP | 2719878 A2 | 4/2014 |
| EP | 2833061 A1 | 2/2015 |
| EP | 2520353 B1 | 11/2015 |
| EP | 2955455 A1 | 12/2015 |
| EP | 2995798 A1 | 3/2016 |
| WO | 1998054419 A1 | 12/1998 |
| WO | 9901656 A1 | 1/1999 |
| WO | 1999001656 A1 | 1/1999 |
| WO | 1999009309 A1 | 2/1999 |
| WO | 0057528 A1 | 9/2000 |
| WO | 2000057528 A1 | 9/2000 |
| WO | 0159272 A1 | 8/2001 |
| WO | 2003091163 A2 | 11/2003 |
| WO | 2004059146 A1 | 7/2004 |
| WO | 2004088108 A1 | 10/2004 |
| WO | 2004100336 A1 | 11/2004 |
| WO | 2004101962 A1 | 11/2004 |
| WO | 2005024201 A1 | 3/2005 |

(56) References Cited

FOREIGN PATENT DOCUMENTS

| | | |
|---|---|---|
| WO | 2005046042 A1 | 5/2005 |
| WO | 2006011465 A1 | 2/2006 |
| WO | 2007046794 A1 | 4/2007 |
| WO | 2007059121 A1 | 5/2007 |
| WO | 2007084140 A1 | 7/2007 |
| WO | 2008076013 A1 | 6/2008 |
| WO | 2008045413 A3 | 7/2008 |
| WO | 2008097797 A2 | 8/2008 |
| WO | 2009077033 A1 | 6/2009 |
| WO | 2009116416 A1 | 9/2009 |
| WO | 2009150884 A1 | 12/2009 |
| WO | 2011081040 A1 | 7/2011 |
| WO | 2011087031 A1 | 7/2011 |
| WO | 2011089989 A1 | 7/2011 |
| WO | 2012015546 A1 | 2/2012 |
| WO | 2012086078 A1 | 6/2012 |
| WO | 2011103088 A4 | 10/2012 |
| WO | 2012163955 A1 | 12/2012 |
| WO | 2013004595 A1 | 1/2013 |
| WO | 2013011520 A1 | 1/2013 |
| WO | 2013036656 A1 | 3/2013 |
| WO | 2013042196 A1 | 3/2013 |
| WO | 2013083620 A1 | 6/2013 |
| WO | 2013096495 A1 | 6/2013 |
| WO | 2013146597 A1 | 10/2013 |
| WO | 2013146598 A1 | 10/2013 |
| WO | 2014058008 A1 | 4/2014 |
| WO | 2014059230 A1 | 4/2014 |
| WO | 2014071148 A1 | 5/2014 |
| WO | 2014071166 A2 | 5/2014 |
| WO | 2014071174 A2 | 5/2014 |
| WO | 2014071215 A1 | 5/2014 |
| WO | 2014074944 A1 | 5/2014 |
| WO | 2014104329 A1 | 7/2014 |
| WO | 2014123804 A3 | 10/2014 |
| WO | 2014158077 A1 | 10/2014 |
| WO | 2014165353 A1 | 10/2014 |
| WO | 2015132688 A4 | 11/2015 |
| WO | 2016031507 A1 | 3/2016 |

* cited by examiner

BACK-UP POWER SYSTEM FOR A COMPONENT AND METHOD OF ASSEMBLING SAME

BACKGROUND

The present disclosure relates generally to back-up power systems for components and, more particularly, to use of a variable frequency drive ("VFD") for back-up power during a power outage.

At least some known systems require back-up power for designated alternating current ("AC")-powered components. For example, some such components are required to continue operating during a power outage, and are sometimes referred to as "critical" components. For example, but not by way of limitation, at least some known gas turbines include exhaust blowers operable to maintain an enclosure in which the gas turbine is located below a threshold temperature, such as to ensure continued accurate operation of sensors within the enclosure that are designed to operate below the threshold temperature. Moreover, while at least some such systems include a back-up AC generator for use during power outages, in at least some cases it is necessary to provide bridge back-up power to components while the back-up AC generator is brought online.

To that end, at least some known systems include a direct current ("DC") back-up system. For example, at least some known systems include a back-up DC "pony" motor that replaces the AC-powered motor of the component during a power outage. However, inclusion of a separate DC motor for each AC-powered component increases an initial cost, a maintenance cost, and/or a footprint of the system. For another example, at least some known systems include an Uninterruptible Power Supply (UPS) system that routes conditioned AC line voltage to selected components during normal operation, and switches to conditioned power provided by DC batteries when an AC line power outage is detected. However, such known UPS systems rely on active power electronics during both normal and outage conditions. The active power electronics create a significant amount of additional heat even during normal operation, which in turn necessitates an increase in design air conditioning capability to offset the increased heat load. The increased air conditioning decreases an efficiency of the system and increases an initial cost and/or an operating cost of the system. Additionally or alternatively, at least some such systems require inverter-ready motors and cables to be used for critical or other selected components, rather than less expensive general duty AC motors and power cables.

BRIEF SUMMARY

In one embodiment, a back-up power control system for an AC-powered component is provided. The system includes a bypass starter coupled to an AC bus, and a variable frequency drive (VFD) coupled to a DC bus. The VFD is selectively operable in each of (i) an active mode, such that said VFD converts DC power provided by the DC bus into a selectable frequency AC power signal, and (ii) a stand-by low-power mode. The system also includes a controller operatively coupled to the bypass starter and the VFD and programmed to (a) while the AC bus is in a normal operating condition, command the VFD to the low-power mode and operatively couple the bypass starter to the AC-powered component, and (b) while the AC bus is in an outage condition, command the VFD to the active mode and operatively couple the VFD to the AC-powered component.

In another embodiment, a method of assembling a back-up power control system for an AC-powered component is provided. The method includes coupling a bypass starter to an AC bus, and coupling a variable frequency drive (VFD) to a DC bus. The VFD is selectively operable in each of (i) an active mode, such that the VFD converts DC power provided by the DC bus into a selectable frequency AC power signal, and (ii) a stand-by low-power mode. The method also includes coupling a controller to the bypass starter and the VFD. The controller is programmed to (a) while the AC bus is in a normal operating condition, command the VFD to the low-power mode and operatively couple the bypass starter to the AC-powered component, and (b) while the AC bus is in an outage condition, command the VFD to the active mode and operatively couple the VFD to the AC-powered component.

In another embodiment, at least one non-transitory computer-readable storage media having computer-executable instructions embodied thereon is provided. When executed by at least one processor of a controller, the computer-executable instructions cause the controller to (a) while an AC bus is in a normal operating condition, command a variable frequency drive (VFD) to a stand-by low-power mode and operatively couple a bypass starter to an AC-powered component. The bypass starter is coupled to the AC bus. The computer-executable instructions further cause the controller to (b) while the AC bus is in an outage condition, command the VFD to an active mode and operatively couple the VFD to the AC-powered component. The VFD in the active mode converts DC power provided by a DC bus into a selectable frequency AC power signal.

DETAILED DESCRIPTION

Embodiments of the present disclosure include a variable frequency drive ("VFD") coupled directly to a DC power source, and a parallel bypass starter coupled directly to an AC line. The embodiments also include a controller operable to detect whether the AC line is in a normal operating condition or, alternatively, in an outage condition. The controller is programmed to command the VFD to a stand-by, low-power mode and connect an AC-powered component to the bypass starter during normal operation, and to command activation of the VFD power electronics and connect the component to the VFD during an outage of the AC line.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Figure 1:
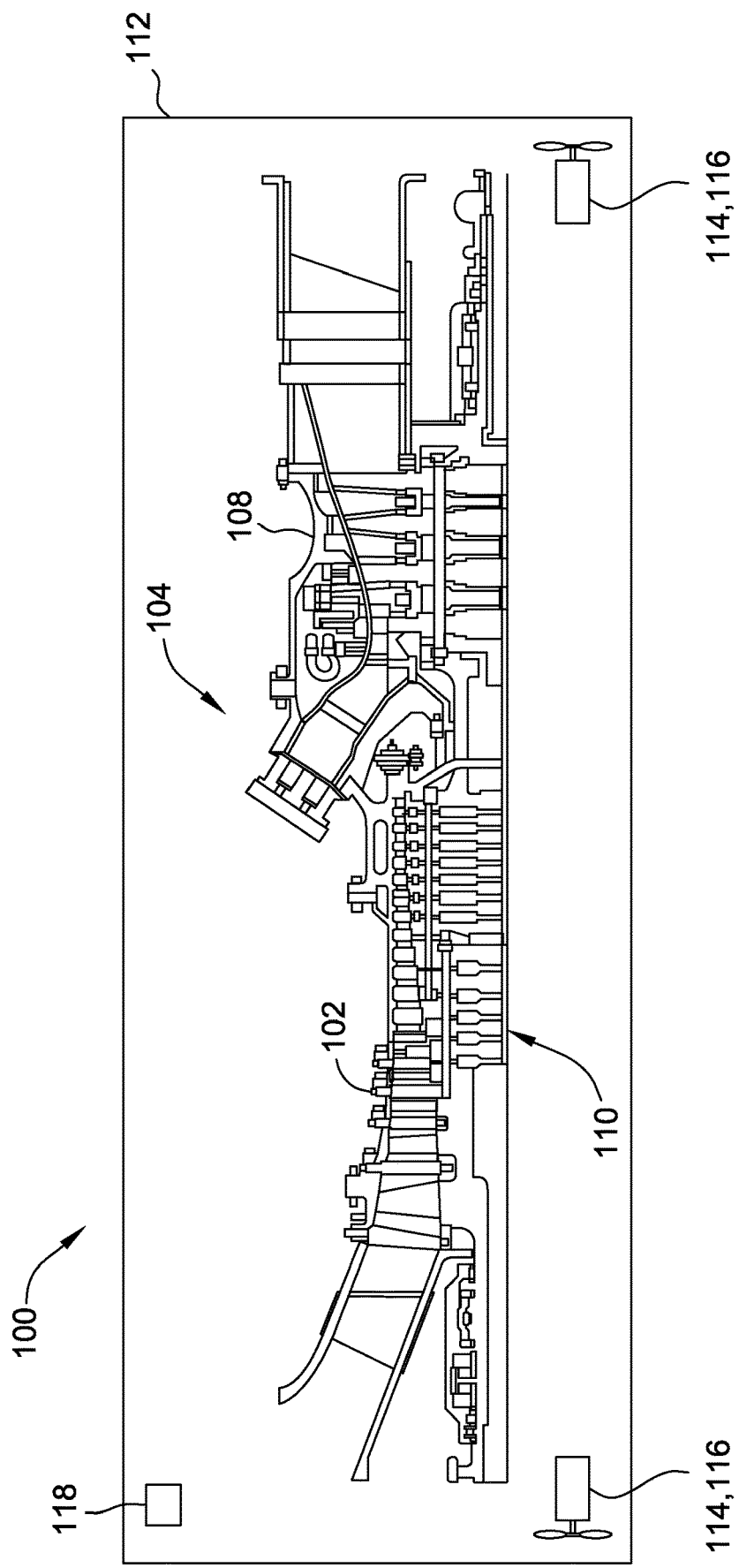
FIG. 1 is a schematic illustration of an exemplary embodiment of a rotary machine.

FIG. 1 is a schematic illustration of an exemplary rotary machine 100. Although embodiments of the present disclosure are described below in the context of rotary machine 100, it should be understood that embodiments of the present disclosure are envisioned for use in any suitable system in which back-up power for an AC-powered component is desired.

In the exemplary embodiment, rotary machine 100 is a gas turbine engine 100 that includes a compressor 102, a combustor 104 coupled downstream from compressor 102, and a turbine 108 coupled downstream from combustor 104. Turbine 108 is coupled to compressor 102 via a rotor shaft 110. It should be noted that, as used herein, the term "couple" is not limited to a direct mechanical, electrical, and/or communication connection between components, but may also include an indirect mechanical, electrical, and/or communication connection between multiple components. An enclosure 112 at least partially encloses one or more of compressor 102, combustor 104, turbine 108, and rotor shaft 110.

During operation, air flows through compressor 102 and compressed air is supplied to combustor 104. Fuel is channeled to a combustion region defined within combustor 104, wherein the fuel is mixed with the compressed air and the mixture is ignited. Combustion gases generated are channeled to turbine 108, which converts gas stream thermal energy to mechanical rotational energy of rotor shaft 110. Rotor shaft 110 drives rotation of compressor 102 and, in addition, drives a load, such as, but not limited to, an electrical generator (not shown). In alternative embodiments, rotary machine 100 is any other suitable rotary machine.

At least one AC-powered component 114 is associated with rotary machine 100. In some embodiments, the at least one AC-powered component 114 is a critical component. The term "critical" in this context refers to a requirement to operate even during an outage of an AC line that normally supplies power to the at least one critical AC-powered component 114. In alternative embodiments, the at least one AC-powered component 114 is other than a critical component.

In the exemplary embodiment, the at least one AC-powered component 114 includes a plurality of AC-powered exhaust blowers 116 located within enclosure 112 to facilitate controlling a temperature within enclosure 112. For example, at least one sensor 118 operable to monitor gas turbine engine 100 is located within enclosure 112, and an accuracy and/or operability of sensor 118 is limited above a threshold temperature within enclosure 112. Operation of exhaust blowers 116 is thus required to maintain the temperature within enclosure 112 below the threshold temperature associated with sensor 118. In alternative embodiments, the at least one AC-powered component 114 includes any suitable AC-powered component associated with any suitable system.

Figure 2:
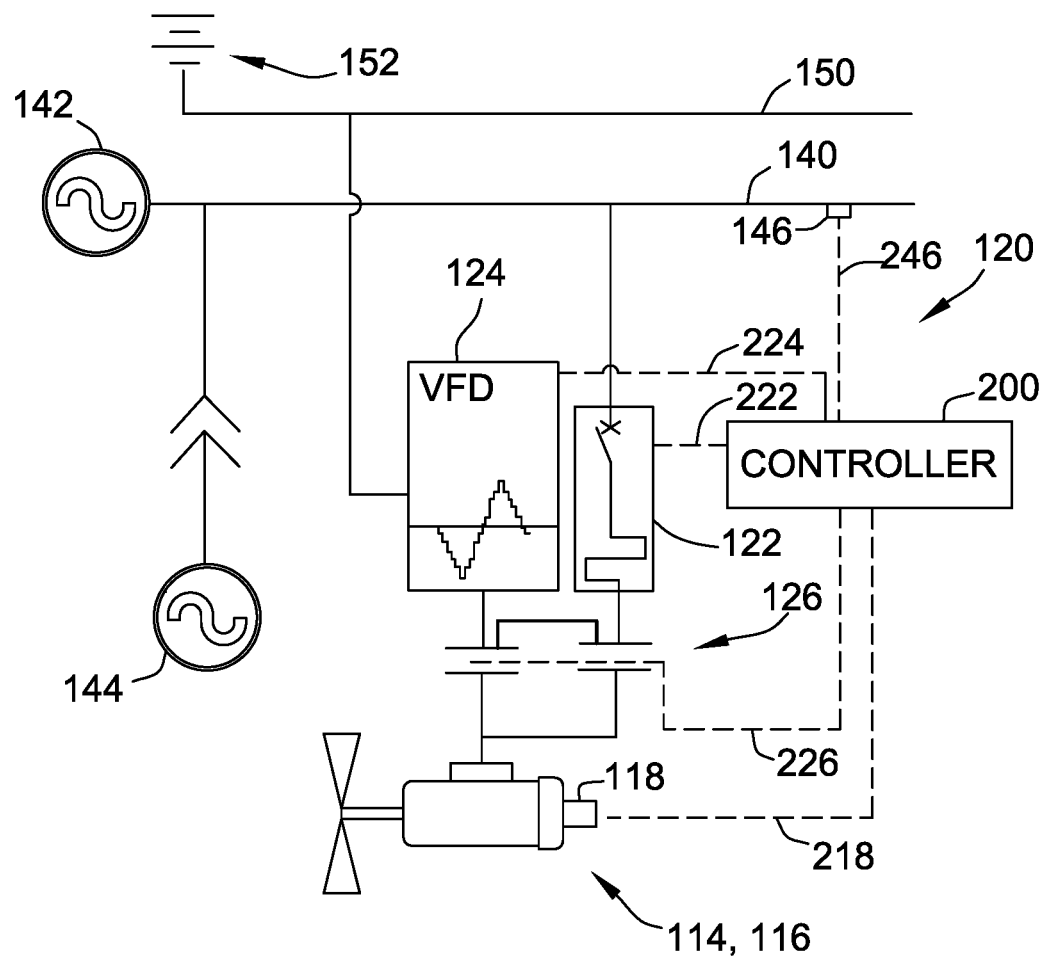
FIG. 2 is a schematic illustration of an exemplary embodiment of a back-up power control system operatively coupled to at least one AC-powered component, such as a component associated with the rotary machine shown in FIG. 1.

FIG. 2 is a schematic illustration of an exemplary back-up power control system 120 operatively coupled to the at least one AC-powered component 114. Back-up power control system 120 is coupled to an AC bus 140 powered by a suitable primary AC power source 142, such as, but not limited to, a facility essential AC line associated with a power plant at which rotary machine 100 is located. In the exemplary embodiment, AC bus 140 is configured to receive back-up power from a secondary AC power source 144 in the event of an outage of primary AC power source 142, and a bridge time is associated with secondary AC power source 144. The bridge time is a time required to bring secondary AC power source 144 online after an outage of primary AC power source 142 occurs. For example, in the exemplary embodiment, secondary AC power source 142 is a diesel generator, and the associated bridge time is eight hours. In alternative embodiments, secondary AC power source 144 is any suitable AC power source and/or the bridge time is any suitable bridge time. In other alternative embodiments, AC bus 140 is not configured to receive power from any secondary source 144.

Back-up power control system 120 is also coupled to a DC bus 150 powered by a suitable DC power source 152, such as, but not limited to, a battery. Back-up power control system 120 is operable to supply power to the at least one AC-powered component 114 directly from AC bus 140 during a normal operating condition of primary AC power source 142, and to supply power to the at least one AC-powered component 114 from DC bus 150 during an outage of primary AC power source 142, such as during the bridge time associated with secondary AC power source 144 as described above.

Back-up power control system 120 includes a bypass starter 122, a VFD 124, an interlock 126 operatively coupled to bypass starter 122 and VFD 124, and a controller 200. Controller 200 is operatively coupled to bypass starter 122 via at least one bypass signal line 222, operatively coupled to VFD 124 via at least one VFD signal line 224, and operatively coupled to interlock 126 via at least one interlock signal line 226. Each of signal lines 222, 224, and 226 is suitably configured to transmit control signals from controller 200 to the associated one of bypass starter 122, VFD 124, and interlock 126, and/or to transmit feedback signals back to controller 200 from the associated one of bypass starter 122, VFD 124, and interlock 126.

Controller 200 also is programmed to determine a state or condition of AC bus 140. More specifically, controller 200 is programmed to determine that AC bus 140 is in one of a normal operating condition, in which AC bus 140 is providing AC power sufficient to operate the at least one AC-powered component 114, and an outage condition, in which AC bus 140 is providing AC power that is other than sufficient to operate the at least one AC-powered component 114. For example, in the exemplary embodiment, controller 200 receives, via at least one AC detection signal line 246, input regarding the state of AC bus 140 from an AC detection sensor 146 coupled to AC bus 140. In alternative embodiments, controller 200 is programmed to determine that the state of AC bus 140 is one of the normal operating condition and the outage condition in any suitable fashion that enables back-up power control system 120 to function as described herein.

In certain embodiments, controller 200 also is programmed to determine a state of the at least one AC-powered component 114. For example, the at least one AC-powered component 114 includes at least one component sensor 118, and controller 200 receives input regarding the state of the at least one AC-powered component 114 via at least one component signal line 218 operatively coupled to component sensor 118. In the exemplary embodiment, the at least one component sensor 118 is an encoder operable to detect a rotational speed of a motor associated with the at least one AC-powered component 114. In alternative embodiments, controller 200 is programmed to determine the state of the at least one AC-powered component 114 in any suitable fashion that enables back-up power control system 120 to function as described herein. In other alternative embodiments, controller 200 is not programmed to determine a state of the at least one AC-powered component 114.

Bypass starter 122 is coupled to AC bus 140 and the at least one AC-powered component 114. More specifically, bypass starter 122 is operable to selectively route AC power present on AC bus 140 to the at least one AC-powered component 114. In certain embodiments, bypass starter 122 includes limited or no power electronics. Thus, while bypass starter 122 operatively couples the at least one AC-powered component 114 to AC bus 140, bypass starter 122 generates an insignificant amount of heat, as compared to VFD 124 in the active mode. In some such embodiments, use of bypass starter 122 during the normal operating condition facilitates a reduced design air conditioning capability for enclosure 112, as opposed to use of VFD 124 in active mode during the normal operating condition.

In some embodiments, the at least one AC-powered component 114 includes a commercial off-the-shelf, general duty AC motor, and bypass starter 122 is a commercial off-the-shelf AC starter configured to operate with a general duty motor. For example, in one embodiment, AC bus 140 is a 480 volt AC bus, the at least one AC-powered component 114 is exhaust blower 116 that includes a general duty 480 volt AC, three-phase, 60 Hertz, 1200 rpm motor, and bypass starter 122 is operable to selectively couple the motor directly to AC bus 140. In alternative embodiments, bypass starter 122 includes any suitable structure that enables back-up power control system 120 to function as described herein.

VFD 124 is coupled to DC bus 150 and the at least one AC-powered component 114. More specifically, VFD 124 is selectively operable in an active mode to convert DC power provided by DC bus 150 into a selectable frequency AC power signal, and to route the converted AC power to the at least one AC-powered component 114. For example, VFD 124 includes power electronics, including active switching elements, that are operable to convert an input DC voltage from DC bus 150 to a selected quasi-sinusoidal AC output voltage suitable to drive the at least one AC-powered component 114. Moreover, in certain embodiments, VFD 124 is further selectively operable in a stand-by low-power mode in which no quasi-sinusoidal AC output voltage is generated, such that VFD 124 generates an insignificant amount of heat relative to VFD 124 in the active mode. In alternative embodiments, VFD 124 includes any suitable structure that enables back-up power control system 120 to function as described herein.

In some embodiments, back-up power control system 120 is configured to monitor, while VFD 124 is in the low-power mode, a readiness of VFD 124 to perform in active mode upon request. For example, in the exemplary embodiment, VFD 124 in low-power mode is configured to output a health status of one of "healthy" or "not healthy" via the at least one VFD signal line 224, and to update the status at suitable intervals. A "healthy" status output by VFD 124 indicates that VFD 124 is available to operate in active mode upon request by controller 200, and a "not healthy" status output by VFD 124 indicates that VFD 124 is not available to operate in active mode upon request by controller 200. Output of the status on the at least one VFD signal line 224 requires only relatively low amounts of power, such that VFD 124 in the low-power mode generates an insignificant amount of heat relative to VFD 124 in the active mode, as described above. Moreover, in the exemplary embodiment, controller 200 is programmed to monitor the status of VFD 124 at suitable intervals and to trigger an alarm condition for review by an operator of rotary machine 100 in the event that the status of VFD 124 in low-power mode indicates "not healthy." In alternative embodiments, back-up power control system 120 is configured to monitor a readiness of VFD 124 in any suitable fashion that enables back-up power control system 120 to function as described herein.

In operation, controller 200 monitors the condition of AC bus 140 at suitable intervals. For example, controller 200 monitors the condition of AC bus 140 substantially continuously. While AC bus 140 is in the normal operating condition, controller 200 commands VFD 124 to the low-power mode and operatively couples bypass starter 122 to the at least one AC-powered component 114, such that the at least one AC-powered component 114 receives power from AC bus 140. Thus, during the normal operating condition, VFD 124 outputs the "healthy/not healthy" status, generates only insignificant amounts of heat, and is not operatively coupled to the at least one AC-powered component 114. While AC bus 140 is in the outage condition, controller 200 commands VFD 124 to the active mode and operatively couples VFD 124 to the at least one AC-powered component 114. More specifically, when controller 200 detects that AC bus 140 is in the outage condition, controller 200 operatively decouples bypass starter 122 from the at least one AC-powered component 114, commands VFD 124 to the active mode, and operatively couples VFD 124 to the at least one AC-powered component 114, such that operation of the at least one AC-powered component 114 is maintained during the outage condition. Subsequently, when controller 200 detects that AC bus 140 has returned from the outage condition to the normal operating condition, controller 200 operatively decouples VFD 124 from the at least one AC-powered component 114, commands VFD 124 to the low-power mode, and operatively couples bypass starter 122 to the at least one AC-powered component 114, such that the at least one AC-powered component 114 again receives power from AC bus 140.

In certain embodiments, when AC bus 140 is in the outage condition and VFD 124 is in the active mode, the at least one AC-powered component 114 is operated at part speed to reduce demand on DC bus 150, such as to increase an available operating duration of DC power source 152. For example, the at least one AC-powered component 114 is exhaust blower 116 that includes a general duty 480 volt AC, three-phase, 60 Hertz, 1200 rpm motor, and operating exhaust blower 116 at full speed would produce a fan flow rate that far exceeds a cooling requirement for enclosure 112 during the outage condition. Controller 200 is programmed to command VFD 124 to produce the quasi-sinusoidal AC output voltage to drive the motor at a speed that is slower than the rated speed, such as but not limited to approximately 600 rpm, such that cooling requirements for enclosure 112 during the outage condition are met without unnecessary demands on DC power source 152. In alternative embodiments, when AC bus 140 is in the outage condition and VFD 124 is in the active mode, the at least one AC-powered component 114 is operated at any suitable speed, including but not limited to full speed.

Additionally or alternatively, an ability to operate the at least one AC-powered component 114 at partial speed to satisfy requirements during the outage condition enables VFD 124 to be sized for direct compatibility with DC power source 152, rather than for compatibility with the nominal rating of the at least one AC-powered component 114. For example, DC power source 152 is configured to provide 240 volts DC, the at least one AC-powered component 114 is exhaust blower 116 that includes a general duty 460 volt AC, three-phase, 60 Hertz, 60 horsepower, 1185 rpm motor, and operating exhaust blower 116 at full speed would again produce a fan flow rate that far exceeds a cooling requirement for enclosure 112 during the outage condition. Rather than implementing VFD 124 as on off-the-shelf VFD unit rated at 460 volts AC, as would be conventional for pairing with a 460 volt AC-rated motor, VFD 124 is implemented as an off-the-shelf VFD unit rated at 208 volts AC and 15 horsepower. Because VFD 124 rated at 208 volts AC is configured to operate on a DC voltage in a range of about 147 volts DC to about 280 volts DC to produce the quasi-sinusoidal signal, VFD 124 rated at 208 volts AC is fully functional when coupled directly to the 240 volt DC power source 152. In contrast, a VFD unit rated at 460 volts AC is configured to operate on a DC voltage in a range of about 400 volts DC to about 670 volts DC to produce the quasi-sinusoidal signal, and would not be fully functional when coupled directly to 240 volt DC power source 152. Moreover, VFD 124 rated at 15 horsepower is capable of driving exhaust blower 116 at the partial speed needed to satisfy the cooling requirement for enclosure 112 during the outage condition. In alternative embodiments, VFD 124 is sized and interfaced with DC power source 152 in any suitable fashion that enables back-up power control system 120 to function as described herein.

In some embodiments, the at least one AC-powered component 114 including a general duty AC motor and power cables is operated at other than rated speed only during outage conditions on AC bus 140, which are comparatively rare and of comparatively short duration relative to normal operating conditions, such that the general duty motor incurs no significant reduction in operational life cycle. Thus, back-up power control system 120 is implemented without any requirement to use a more expensive inverter-ready motor and associated cables for the at least one AC-powered component 114. In alternative embodiments, the at least one AC-powered component 114 is implemented using any suitable motor and/or cables.

In certain embodiments, because back-up power control system 120 does not require inverter-ready AC motors or separate DC-driven pony motors, back-up power control system 120 is suitable for a retrofit installation, for example as a replacement for a pre-existing back-up power system of rotary machine 100, without any requirement for an increased footprint to accommodate back-up power control system 120 or for replacement of existing general-duty component motors. In alternative embodiments, rotary machine 100 is initially designed to include back-up power control system 120.

In the exemplary embodiment, interlock 126 is operatively coupled to bypass starter 122 and VFD 124 such that simultaneous driving of the at least one AC-powered component 114 by bypass starter 122 and VFD 124 is precluded. Thus, interlock 126 facilitates preventing an overload of the at least one AC-powered component 114 and/or back feed from one of bypass starter 122 and VFD 124 to the other of bypass starter 122 and VFD 124. For example, interlock 126 is implemented as a suitable mechanical interlock, such that it is not physically possible for both bypass starter 122 and VFD 124 to be switched into line with the at least one AC-powered component 114 at the same time. Additionally or alternatively, interlock 126 is implemented as a suitable software interlock in controller 200. In alternative embodiments, interlock 126 precludes simultaneous driving by bypass starter 122 and VFD 124 of the at least one AC-powered component 114 in any suitable fashion.

Moreover, in the exemplary embodiment, controller 200 is programmed to implement a delay in selectively switching the at least one AC-powered component 114 between bypass starter 122 and VFD 124. More specifically, immediately after either bypass starter 122 or VFD 124 is operatively decoupled from the at least one AC-powered component 114, a residual magnetic field remains in the at least one AC-powered component 114. Coupling the other of bypass starter 122 and VFD 124 to the at least one AC-powered component 114 out of phase with the residual magnetic field could potentially damage the at least one AC-powered component 114. Thus, after either bypass starter 122 or VFD 124 is operatively decoupled from the at least one AC-powered component 114, controller 200 is programmed to implement a delay that facilitates decay of the residual magnetic field before operatively coupling the other of bypass starter 122 and VFD 124 to the at least one AC-powered component 114.

For one example, when controller 200 detects that AC bus 140 has changed from the normal operating condition to the outage condition, controller 200 operatively decouples bypass starter 122 from the at least one AC-powered component 114, commands VFD 124 to the active mode, and implements the delay as a preselected time period, such as but not limited to 20 seconds, before operatively coupling VFD 124 to the at least one AC-powered component 114. For another example, the at least one component sensor 118 is an encoder operable to detect a rotational speed of a motor associated with the at least one AC-powered component 114, and when controller 200 detects that AC bus 140 has changed from the normal operating condition to the outage condition, controller 200 operatively decouples bypass starter 122 from the at least one AC-powered component 114, commands VFD 124 to the active mode, and implements the delay until component sensor 118 detects a zero speed of the motor before operatively coupling VFD 124 to the at least one AC-powered component 114.

In alternative embodiments, controller 200 is not programmed to implement a delay before selectively switching the at least one AC-powered component 114 between bypass starter 122 and VFD 124.

Figure 3:
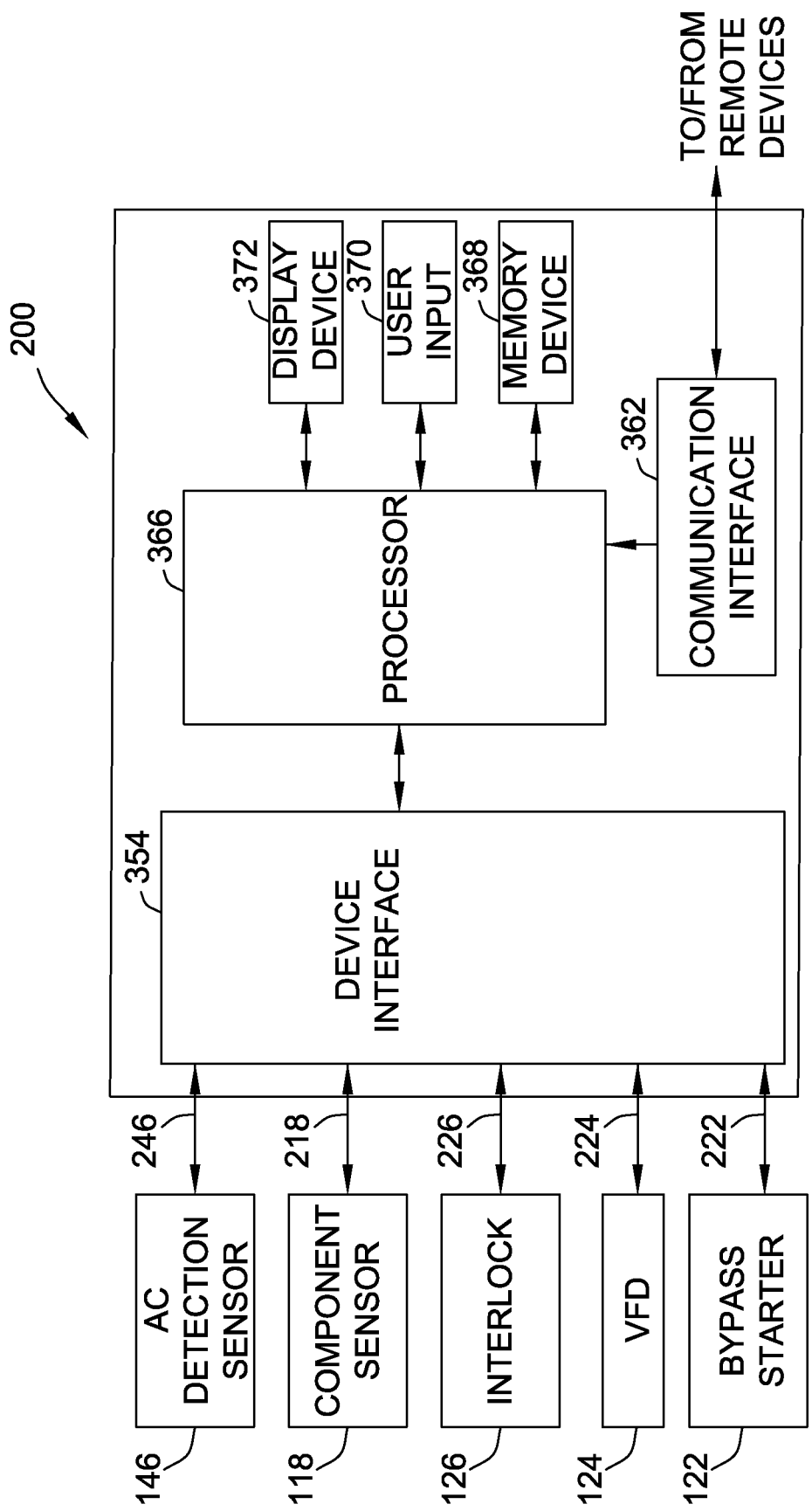
FIG. 3 is a block diagram of an exemplary embodiment of a controller for use with the back-up power control system shown in FIG. 2.

FIG. 3 is a block diagram of an exemplary embodiment of controller 200. In the exemplary embodiment, controller 200 includes a memory device 368 and a processor 366 operatively coupled to memory device 368 for executing instructions. Processor 366 is, for example and without limitation, a microprocessor, a microcontroller, or other equivalent processing device capable of executing commands of computer readable data or programs for executing a control algorithm. In some embodiments, processor 366 includes a plurality of processing units, for example and without limitation, coupled in a multi-core configuration. In some embodiments, executable instructions are stored in memory device 368. Controller 200 is configurable to perform one or more operations described herein by programming processor 366. For example, processor 366 is programmed by encoding an operation as one or more executable instructions and providing the executable instructions in memory device 368.

In the exemplary embodiment, memory device 368 includes one or more devices that enable storage and retrieval of information such as executable instructions and/or other data. Memory device 368 includes one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program. Memory device 368 is configured to store, without limitation, application source code, application object code, source code portions of interest, object code portions of interest, configuration data, execution events and/or any other type of data. For example, memory device 368 includes, without limitation, sufficient data, algorithms, and commands to facilitate operation of back-up power control system 120 as described above. Moreover, memory device 368 is configured to store configuration parameters and operational measurements associated with each of bypass starter 122, VFD 124, interlock 126, the at least one component sensor 118, AC detection sensor 146, and any other suitable device associated with back-up power control system 120 and/or rotary machine 100. Additionally or alternatively, memory device 368 is configured to store any other type of data.

Controller 200 also includes at least one device interface 354 coupled to processor 366 and suitably configured to transmit instructions from processor 366 to external devices, and/or to transmit feedback signals received from external devices to processor 366. More specifically, in the exemplary embodiment, device interface 354 operatively couples processor 366 to each of bypass starter 122, VFD 124, interlock 126, the at least one component sensor 118, and AC detection sensor 146 via respective signal lines 222, 224, 226, 218, and 246 described above. Additionally or alternatively, the at least one device interface 354 is configured to facilitate communication between processor 366 and any other suitable device associated with back-up power control system 120 and/or rotary machine 100.

In some embodiments, controller 200 includes a display device 372 coupled to processor 366. Display device 372 presents information, such as a user interface and/or an alarm, to an operator of rotary machine 100 (shown in FIG. 1). In one embodiment, display device 372 includes a display adapter (not shown) that is coupled to a display device (not shown), such as a cathode ray tube (CRT), a liquid crystal display (LCD), an organic LED (OLED) display, and/or an "electronic ink" display. In some embodiments, display device 372 includes one or more display devices.

In some embodiments, controller 200 includes a user input interface 370. In the exemplary embodiment, user input interface 370 is coupled to processor 366 and receives input from an operator of rotary machine 100. User input interface 370 includes, for example, a keyboard, a pointing device, a mouse, a stylus, a touch sensitive panel, e.g., without limitation, a touch pad or a touch screen, and/or an audio input interface, e.g., without limitation, a microphone. A single component, such as a touch screen, is capable of functioning as both display device 372 and user input interface 370.

In some embodiments, a communication interface 362 is coupled to processor 366 and is configured to be coupled in communication with one or more remote devices, such as but not limited to a network server, and to perform input and output operations with respect to such devices. For example, communication interface 362 includes, without limitation, a wired network adapter, a wireless network adapter, a mobile telecommunications adapter, a serial communication adapter, and/or a parallel communication adapter. Communication interface 362 receives data from and/or transmits data to the one or more remote devices. For example, communication interface 362 of one controller 200 transmits an alarm to the communication interface 362 of another controller 200.

Display device 372 and/or communication interface 362 are both capable of providing information suitable for use with the methods described herein, e.g., to an operator of rotary machine 100 and/or to another device. Accordingly, display device 372 and communication interface 362 are each referred to as output devices. Similarly, user input interface 370 and communication interface 362 are capable of receiving information suitable for use with the methods described herein and are each referred to as input devices.

In alternative embodiments, controller 200 is implemented in any suitable fashion that enables back-up power control system 120 to function as described herein.

Figure 4:
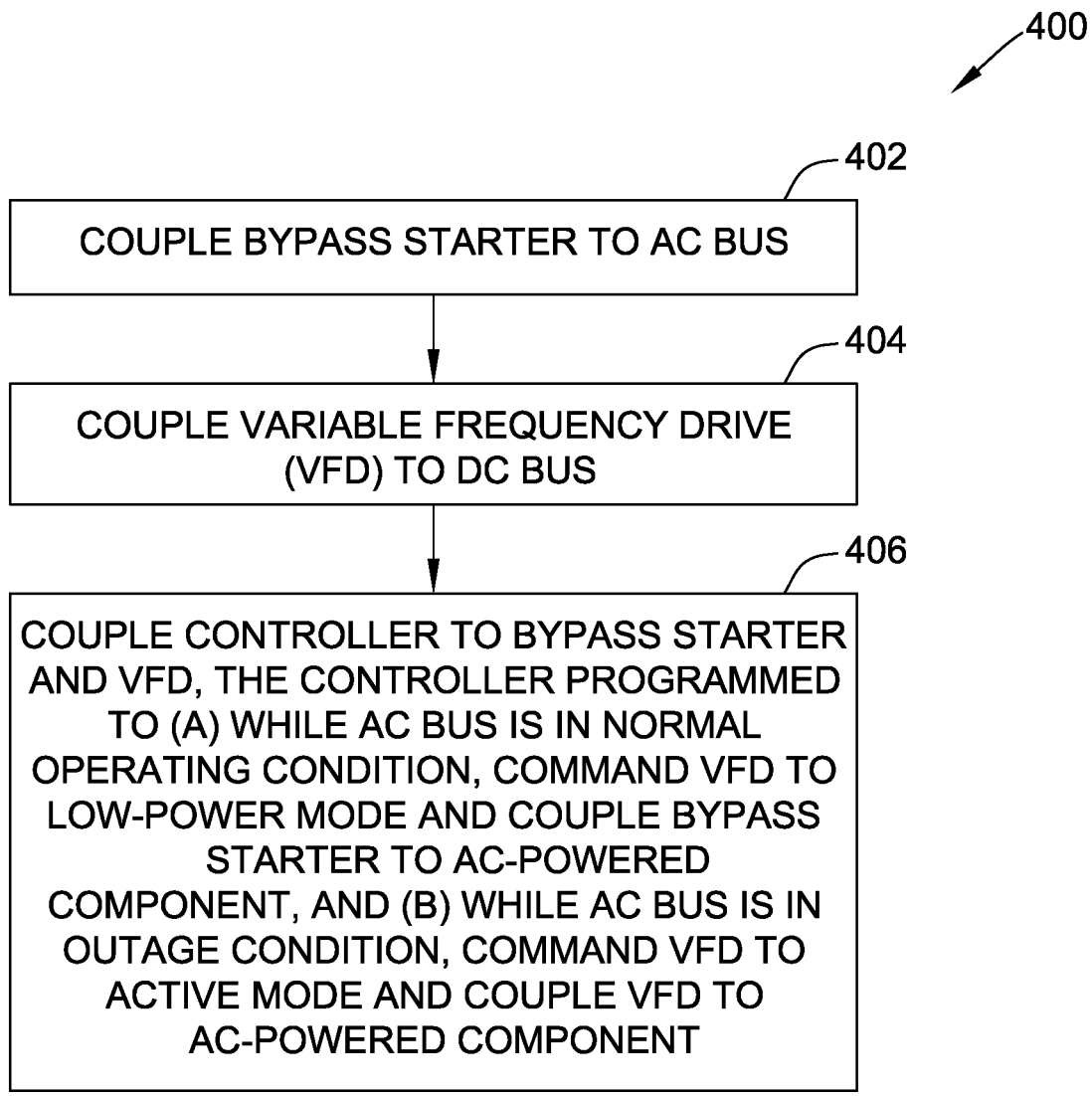
FIG. 4 is a flow diagram of an exemplary embodiment of a method of assembling a back-up power control system, such as the back-up power control system shown in FIG. 2, for an AC-powered component, such as a component associated with the rotary machine shown in FIG. 1.

FIG. 4 is a flow diagram of an exemplary embodiment of a method 400 of assembling a back-up power control system, such as back-up power control system 120, for an AC-powered component, such as the at least one AC-powered component 114. With reference also to FIGS. 2 and 3, in the exemplary embodiment, method 400 includes coupling 402 a bypass starter, such as bypass starter 122, to an AC bus, such as AC bus 140. Method 400 also includes coupling 404 a variable frequency drive, such as VFD 124, to a DC bus, such as DC bus 150. The VFD is selectively operable in each of (i) an active mode, such that the VFD converts DC power provided by the DC bus into a selectable frequency AC power signal, and (ii) a stand-by low-power mode, such as the modes described above for VFD 124. Method 400 further includes coupling 406 a controller, such as controller 200, to the bypass starter and the VFD. The controller is programmed to (a) while the AC bus is in a normal operating condition, command the VFD to the low-power mode and operatively couple the bypass starter to the AC-powered component, and (b) while the AC bus is in an outage condition, command the VFD to the active mode and operatively couple the VFD to the AC-powered component, such as described above for VFD 124. In alternative embodiments, method 400 includes additional and/or alternative steps in accordance with the embodiments of back-up power control system 120 described above.

Embodiments of the above-described back-up power control system and method provide an advantage over at least some known systems for providing back-up power to components. The embodiments are especially, but not only, useful where it is necessary to provide bridge back-up power to critical components while a back-up AC generator is brought online. Specifically, because the power electronics of the VFD are active only during outage conditions, the significant heat generated by the VFD in active mode need not be accounted for when establishing a design air conditioning capability for normal operating conditions for an enclosure in which the VFD is located. Also specifically, because the VFD is used to drive the component only during outage conditions, in some embodiments a general duty motor and standard cables may be used for the component, rather than a more expensive inverter-ready motor and associated cables. Also specifically, because no substitute DC pony motor is required to enable use of a DC back-up power source for the component, a footprint of the back-up power system is reduced. Also specifically, the VFD enables the component to be driven at selected speeds that are less than a rated speed of the motor, which facilitates operating the component in a fashion that draws less power from the DC power source, thereby removing an unnecessary drain on the DC power source in some embodiments. Also specifically, an ability to operate the component at partial speed to satisfy requirements during the outage condition enables the VFD to be sized for direct compatibility with a facility DC power source, rather than for compatibility with the nominal rating of a motor of the component.

An exemplary technical effect of the methods, systems, and apparatus described herein includes at least one of: (a) reducing heat generated by signal conditioning equipment associated with the component; (b) reducing a footprint of the back-up power system; (c) decreasing purchase and maintenance costs of a motor associated with the component; and (d) increasing a duration of availability of a back-up DC power source.

Exemplary embodiments of back-up power control systems are described above in detail. The back-up power control systems, and methods and systems using such back-up power control systems, are not limited to the specific embodiments described herein, but rather, components of systems and/or steps of the methods may be utilized independently and separately from other components and/or steps described herein. For example, the exemplary embodiments can be implemented and utilized in connection with many other applications that require back-up power for an AC-powered component.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A back-up power control system for an AC-powered motor rated to operate on a first voltage, said system comprising:
    a bypass starter coupled to an AC bus;
    a variable frequency drive (VFD) coupled to an external DC power source via an external DC bus, wherein said external DC power source is isolated from the AC bus, and wherein only the external DC bus is configured to supply DC power during a power outage condition of the AC bus, said VFD rated in correspondence with said external DC power source and selectively operable in each of (i) an active mode, such that said VFD converts DC power provided by the external DC bus into a selectable frequency AC power signal having a second voltage, the second voltage being less than the first voltage, and (ii) a stand-by low-power mode; and
    a controller operatively coupled to said bypass starter and said VFD, said controller programmed to:
        while the AC bus is in a normal operating condition, command said VFD to the low-power mode and operatively couple said bypass starter to the AC-powered motor to transmit the first voltage to the AC-powered motor, the first voltage causing the AC-powered motor to operate at a first speed;
        detect that the AC bus is in the power outage condition; and
        in response to detecting that the AC bus is in the power outage condition, command said VFD to the active mode and operatively couple said VFD to the AC-powered motor to transmit the second voltage to the AC-powered motor, the second voltage causing the AC-powered motor to operate at a second speed less than the first speed.

2. The back-up power control system of claim 1, wherein, while said bypass starter operatively couples the AC-powered motor to the AC bus, said bypass starter generates less heat as compared to said VFD in the active mode.

3. The back-up power control system of claim 1, wherein said VFD in the low-power mode generates less heat as compared to said VFD in the active mode.

4. The back-up power control system of claim 1, wherein said controller is further programmed to implement a delay in selectively switching the AC-powered motor between said bypass starter and said VFD.

5. The back-up power control system of claim 4, wherein the controller is further programmed to implement the delay as a preselected time period.

6. A back-up power control system for an AC-powered motor, said system comprising: a bypass starter coupled to an AC bus; a variable frequency drive (VFD) coupled to a DC bus, said VFD is selectively operable in each of (i) an active mode, such that said VFD converts DC power provided by the DC bus into a selectable frequency AC power signal, and (ii) a stand-by low-power mode;
    and a controller operatively coupled to said bypass starter and said VFD, said controller programmed to: while the AC bus is in a normal operating condition, command said VFD to the low-power mode and operatively couple said bypass starter to the AC-powered motor; while the AC bus is in an outage condition, command said VFD to the active mode and operatively couple said VFD to the AC-powered motor; and implement a delay in selectively switching the AC-powered motor between said bypass starter and said VFD, wherein a motor sensor is coupled to the AC-powered motor, and the controller is further programmed to implement the delay until the motor sensor detects a zero speed associated with the AC-powered motor.

7. The back-up power control system of claim 1, further comprising an interlock operatively coupled to said bypass starter and said VFD such that simultaneous driving of the AC-powered motor by said bypass starter and said VFD is precluded.

8. The back-up power control system of claim 1, wherein said VFD is operable to output a health status while in the low-power mode, and said controller is further programmed to monitor the health status.

9. A method of assembling a back-up power control system for an AC-powered motor rated to operate on a first voltage, said method comprising:
- coupling a bypass starter to an AC bus;
- coupling a variable frequency drive (VFD) to an external DC power source via an external DC bus, wherein the external DC power source is isolated from the AC bus and only the external DC bus is configured to supply DC power during a power outage condition of the AC bus, wherein the VFD is rated in correspondence with the external DC power source and selectively operable in each of (i) an active mode, such that the VFD converts DC power provided by the external DC bus into a selectable frequency AC power signal having a second voltage, the second voltage being less than the first voltage, and (ii) a stand-by low-power mode; and
- coupling a controller to the bypass starter and the VFD, wherein the controller is programmed to:
- while the AC bus is in a normal operating condition, command the VFD to the low-power mode and operatively couple the bypass starter to the AC-powered motor to transmit the first voltage to the AC-powered motor, the first voltage causing the AC-powered motor to operate at a first speed;
- detect that the AC bus is in the power outage condition; and
- in response to detecting that the AC bus is in the power outage condition, command the VFD to the active mode and operatively couple the VFD to the AC-powered motor to transmit the second voltage to the AC-powered motor, the second voltage causing the AC-powered motor to operate at a second speed less than the first speed.

10. The method of claim 9, wherein coupling the VFD to the AC-powered motor comprises coupling the VFD to a general duty motor associated with the AC-powered motor.

11. The method of claim 9, wherein coupling the bypass starter comprises coupling the bypass starter that generates less heat while the bypass starter operatively couples the AC-powered motor to the AC bus, as compared to the VFD in the active mode.

12. The method of claim 9, wherein coupling the VFD comprises coupling the VFD that in the low-power mode generates less heat as compared to the VFD in the active mode.

13. The method of claim 9, further comprising coupling the controller to a motor sensor coupled to the AC-powered motor, wherein the controller is further programmed to implement a delay in selectively switching the AC-powered motor between the bypass starter and the VFD, and wherein the delay extends until the motor sensor detects a zero speed associated with the AC-powered motor.

14. The method of claim 9, further comprising operatively coupling an interlock to the bypass starter and the VFD, wherein the interlock precludes simultaneous driving of the AC-powered motor by the bypass starter and the VFD.

15. At least one non-transitory computer-readable storage media having computer-executable instructions embodied thereon, wherein when executed by at least one processor of a controller, the computer-executable instructions cause the controller to:
- while an AC bus is in a normal operating condition, command a variable frequency drive (VFD) to a stand-by low-power mode and operatively couple a bypass starter to an AC-powered motor to transmit a first voltage to the AC-powered motor, the AC-powered motor rated to operate on the first voltage and the first voltage causing the AC-powered motor to operate at a first speed, wherein the bypass starter is coupled to the AC bus, and wherein the VFD is coupled to an external DC power source via a DC bus, the external DC power source being isolated from the AC bus, and wherein the VFD is rated in correspondence with the external DC power source;
- detect that the AC bus is in a power outage condition; and
- in response to detecting that the AC bus is in the power outage condition, command the VFD to an active mode and operatively couple the VFD to the AC-powered motor to transmit a second voltage to the AC-powered motor, the second voltage being less than the first voltage and causing the AC-powered motor to operate at a second speed less than the first speed, wherein the VFD in the active mode converts DC power provided only by an external DC bus into a selectable frequency AC power signal.

16. The computer-readable storage media of claim 15, wherein the computer-executable instructions further cause the controller to implement a delay in selectively switching the AC-powered motor between the bypass starter and the VFD.

17. The computer-readable storage media of claim 16, wherein the computer-executable instructions further cause the controller to implement the delay until a motor sensor detects a zero speed of associated with the AC-powered motor.

18. The computer-readable storage media of claim 15, wherein the computer-executable instructions further cause the controller to monitor a health status output by the VFD while in the low-power mode.

* * * * *